Figure 1:
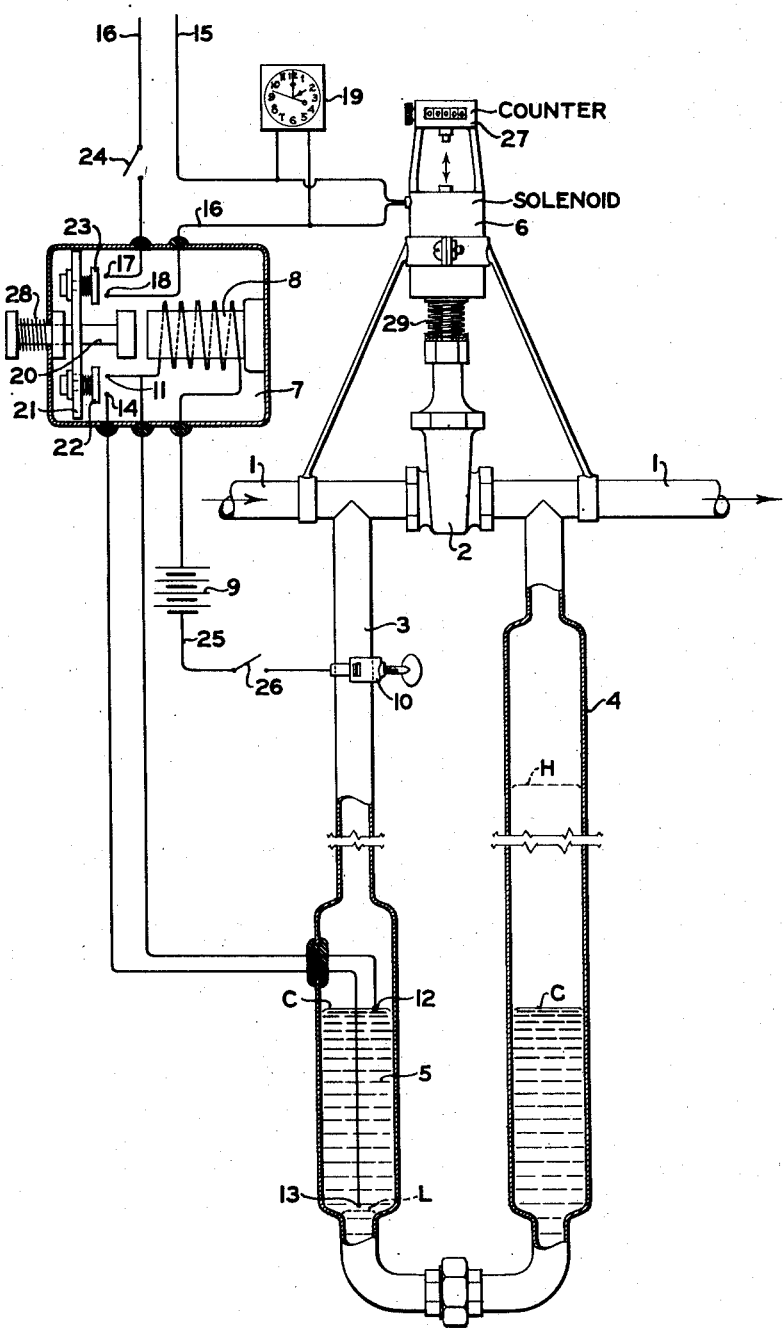

Aug. 3, 1943.  J. McAFEE  2,325,695
FLUID METER
Filed Aug. 22, 1941  2 Sheets-Sheet 1

INVENTOR
JERRY MC AFEE
BY *[signature]*
ATTORNEY

Aug. 3, 1943.    J. McAFEE    2,325,695
FLUID METER
Filed Aug. 22, 1941.    2 Sheets-Sheet 2

INVENTOR
JERRY McAFEE
BY *Lee J Gary*
ATTORNEY

Patented Aug. 3, 1943

2,325,695

UNITED STATES PATENT OFFICE 2,325,695

FLUID METER

Jerry McAfee, Chicago, Ill., assignor to Universal Oil Products Company, Chicago, Ill., a corporation of Delaware Application August 22, 1941, Serial No. 407,948

6 Claims. (Cl. 73—219)

The invention relates to improved means of metering fluids and will be found particularly useful in determining the average rate of flow of fluid through a conduit, as well as positively and accurately measuring the volume.

The metering device provided is of the positive displacement type and employs a U tube construction. Fluid from the stream being measured is admitted to one leg of the U tube and displaces a heavier liquid which is forced into the other leg of the U tube, the latter being calibrated. When said liquid reaches a predetermined level in the last mentioned leg it is caused to recede and force the measured fluid in the opposite leg back into said conduit through which it flows to its destination.

In its simplest form, which is useful for fairly accurate determination of flow rates, a single U tube is employed, the opposite legs of which communicate with the conduit, through which the fluid is passed, on opposite sides of a block valve in the conduit. The valve is closed to direct fluid from the conduit into that leg of the U tube wherein it displaces the heavier liquid and when the desired predetermined level of the latter is reached in the other leg of the U tube, the valve is opened, allowing the heavy liquid to recede and force the metered fluid back into the conduit and through the valve to its destination. By observing the time required for displacement of a predetermined volume of said liquid, the rate of flow can be readily calculated.

The aforementioned valve may be manually opened and closed but, in the preferred embodiment of the invention, this is accomplished automatically, preferably by employing a motor or solenoid operated valve which is opened and closed by electrical impulses transmitted thereto through a suitable relay or the like which opens and closes the circuit to the valve in response to changes in the level of liquid in the U tube. With this arrangement, the metering device may be operated over a protracted period of time and by counting the displacements during this period, a fairly accurate determination of the average rate of flow is obtained. Preferably, a counting device of conventional type is provided and arranged to be tripped in each cycle of operation in the U tube. Also, when desired, a timing device is provided and may comprise, for example, a synchronous motor clock operated from the same source of electrical energy as the solenoid or motor which operates the valve. With the automatically operated valve, and the automatic counter and timer, the device can be operated continuously and only periodic reading of the timing device and counter is required to obtain data for ready calculation of the average flow rate over the elapsed period of time between readings.

In another embodiment of the device provided by the invention, which is useful for accurately measuring the quantity of fluid passed through the conduit, as well as for accurate determination of its average rate of flow, I provide two U tubes connected to the conduit in parallel, with provision for alternating the introduction of fluid thereto from the conduit and alternately discharging the fluid therefrom to make the operation of the device continuous over any desired period of time. In this form of device, a four-way valve may be employed to alternate the flow of fluid with respect to the U tubes. A counting device is also preferably employed to give visual indication of the quantity of fluid passed into and from the U tubes and, when it is desired to measure flow rate as well as volume, a timing device may be provided or the counter may be timed against any convenient clock or watch to determine the average rate of flow in gallons per hour or in any other convenient units.

The features of the invention will be more apparent with reference to the accompanying diagrammatic drawings and the following description thereof. The drawings illustrate two specific forms of the device provided by the invention and includes an illustration of relay systems suitable for serving the motor or solenoid operated valves.

In the drawings,

Fig. 1 is a diagrammatic elevational view, shown partly in section, of one specific form of the device provided by the invention for measuring the rate of flow of fluid.

Figure 2:
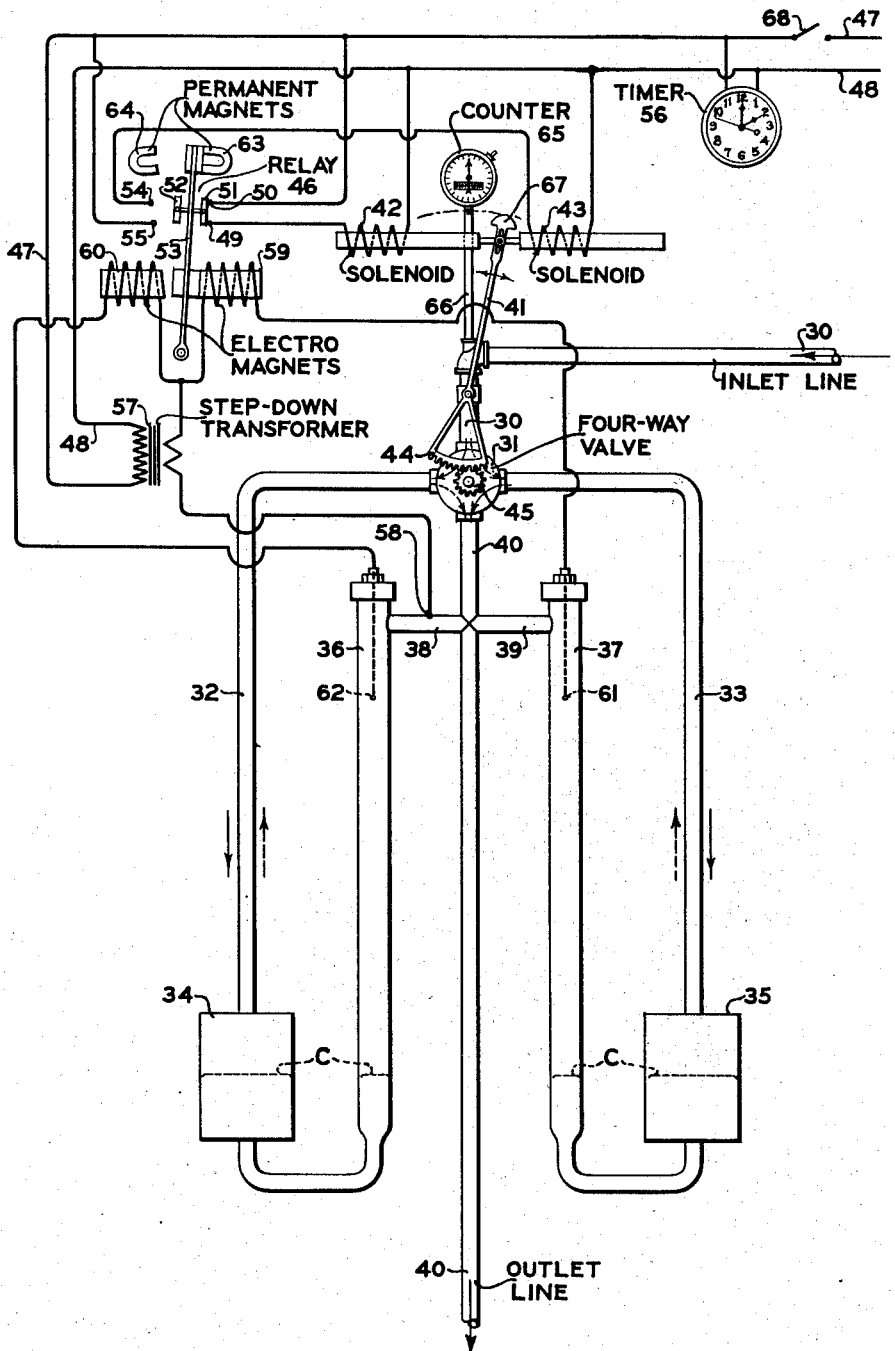

Fig. 2 which is diagrammatic and partially schematic, illustrates another embodiment of the device provided by the invention for measuring either rate of flow or volume of flow or both.

Referring now to Fig. 1, the conduit through which the fluid to be metered passes is designated by the reference numeral 1, the direction of flow therethrough being indicated by arrows. A valve 2 is provided in line 1 and the opposite legs 3 and 4 of the U tube are connected with conduit 1 on opposite sides of the valve.

A suitable liquid, indicated at 5, which is substantially non-miscible and non-absorbable with the fluid to be measured and is more conductive to electricity, is disposed in the U tube and, when valve 2 is open, seeks a common level, indicated at C, in the opposite legs 3 and 4. When valve 2 is closed, fluid flowing into leg 3 of the U tube from conduit 1 on the upstream side of the valve forces the liquid in leg 3 downward to a predetermined low level indicated at L and forces the level of the liquid upward in leg 4 to the point indicated at H. When levels L and H are reached, valve 2 is opened allowing the liquid in leg 4 to recede, forcing the liquid upward in leg 3 until the common level C is reestablished in the two legs and forcing fluid from leg 3 back into conduit 1 to join the stream thereof now flowing through valve 2. The volume occupied by the liquid between levels C and H in leg 4 is predetermined so that, by noting the time required for the liquid level in tube 4 to traverse the distance between points C and H, the rate of flow of the fluid in conduit 1 during this period of time can be easily determined.

To make the device automatic in its operation, a solenoid 6 of the spring return type is provided to open and close valve 6, electrical energy being supplied to the solenoid through relay 7 which makes and breaks contact in response to the level of the liquid 5 in leg 3 of the U type.

Relay 7 comprises an electromagnet 8, obtaining E. M. F. from battery 9 or any other convenient source of low voltage current which is grounded at 10 to the electrical conductive metal leg 3 of the U tube, the opposite pole of the battery being connected with one end of the coil of the electromagnet. The opposite end of the coil of electromagnet 8 is connected with each of the contact points 11 and 12, the latter being positioned within leg 3 of the U tube at the liquid level C and spaced from the wall of leg 3. A similar contact point 13 is disposed within leg 3 and spaced from its wall at an elevation slightly above the liquid level L. The contact point 13 is connected with contact point 14 which latter is disposed adjacent contact point 11 of the relay.

Electrical energy from any convenient source for operating the solenoid is transmitted thereto through lines 15 and 16, the latter being broken within the relay box and terminating at the break in the adjacent contact points 17 and 18. Clock 19 driven by a self-starting synchronous motor is connected to lines 15 and 16 in parallel with the solenoid in such a manner that the circuit to the clock is broken when the circuit to the solenoid is broken at contact points 17 and 18. A hand-operated make-and-break switch 24 is also provided in line 16.

Preferably a counter 27 is provided and arranged to be tripped at the end of each cycle of operation of the device. In the case illustrated it is mounted above solenoid 6 and is tripped by the solenoid plunger when valve 2 is opened.

The electromagnet 8 operates a spring return plunger 20 to which a non-conductive arm 21 is attached, carrying conductors 22 and 23. Conductor 22 spans the distance between the contact points 11 and 14 to electrically connect the same when electromagnet 8 is energized. Conductor 23 spans the distance between contact points 17 and 18 to electrically connect the same and make the circuit to solenoid 6 and clock 19 when electromagnet 8 is energized.

Assuming a definite set of conditions to more concretely illustrate the operation of the device, the fluid to be measured, which flows through line 1 is a hydrocarbon liquid and the liquid 5 in the U tube is mercury. The volume of the space between levels C and H in line 4 of the U tube is 23.1 cubic inches. With the mercury at level C in the U tube, the clock 19 set at an even hour and the counter 27 set at zero, measurement of the flow rate through conduit 1 is started by closing switches 24 and 26. Closing switch 26 causes the current to flow through the electromagnet 8 from battery 9, the circuit being made from contact point 12 to the metal wall of leg 3 through the mercury 5.

By thus energizing the electromagnet 8, plunger 20 is attracted and moved to the right so that the conductor 22 bridges the gap between the contact points 11 and 14 and conductor 23 bridges the gap between contact points 17 and 18. Current then flows to clock 19 to start and operate the same and to solenoid 6 which is actuated to close valve 2 and block the flow of fluid therethrough. With valve 2 thus closed, fluid flows from conduit 1 into leg 3 above the mercury, forcing the latter downward therein and upward in the opposite leg 4 of the U tube.

The circuit through the electromagnet remains closed after the mercury recedes below contact point 12 by virtue of the flow of current through the mercury from contact point 13 to the wall of leg 3 and the closed circuit at points 11 and 14. The electromagnet will thus remain energized until the mercury recedes to level L beneath contact point 13, the circuit being then broken by virtue of the much lower conductivity of the hydrocarbon liquid surrounding the contact point 13, as compared with the conductivity of the mercury. While the mercury in leg 3 of the U tube recedes from level C to level L, that in leg 4 of the U tube rises from level C to level H, so that 23.1 cubic inches of the hydrocarbon liquid have been passed into leg 3.

When levels L and H are reached and the electromagnet is thus de-energized, plunger 20 is released and returned by spring 28 to a position at which contact is broken between points 11 and 14 and between points 17 and 18. Thus, current ceases to flow to clock 19 and solenoid 6, stopping the former and returning valve 2 by means of spring 29 to the position in which valve 2 is opened and counter 27 is tripped.

With valve 2 open, the mercury column in leg 4 recedes to level C, rising to the same level in leg 3 and forcing the measure volume of liquid back into the stream thereof now passing through conduit 1 and valve 2. When the mercury reaches level C in leg 3, the circuit to the electromagnet and the circuit to the solenoid and clock are again made and the operation is repeated.

A reading to determine the flow rate is taken by noting the number of trips indicated by the counter and noting the time shown by the clock since the last reading. Since 23.1 cubic inches or $\frac{1}{10}$ of a gallon is the displacement of the device each time the counter is tripped, the flow rate in gallons per hour is determined by dividing the reading of the counter by 10 and dividing the result by that fraction or multiple of an hour indicated by the clock. For example, if the reading obtained from the counter is 20 and the reading obtained from the clock is 6 minutes or $\frac{1}{10}$ of an hour, the average flow rate is 20 gallons per hour (20÷10=2 and 2÷$\frac{1}{10}$=20). This will prove to be a fairly accurate determination, even though measurement of the flow is intermittent rather than strictly continuous, if the device is permitted to operate for a sufficient length of time between the readings to average out variations in the flow throughout intervals during which valve 2 is open as compared with those during which it is closed.

More accurate measurement of flow rates and positive measurement of quantities is possible with a device of the modified type illustrated in Fig. 2, which will now be described.

In Fig. 2 the inlet line 30, through which the fluid to be measured is supplied, is connected with a four-way valve 31 having conduits 32 and 33 leading therefrom to reservoirs 34 and 35, respectively, which are connected at their bottoms with the lower end of the respective standpipes or legs 36 and 37. From the upper ends of legs 36 and 37, the respective conduits 38 and 39 communicate with discharge conduit 40 which is connected at its upper end with the four-way valve 31.

One of the U tubes of the metering device, in this instance, comprises conduit 32, accumulator 34 and leg or standpipe 36. The other U tube comprises conduit 33, accumulator 35 and the leg or standpipe 37.

The four-way valve 41 is, in this particular instance, of the rotary plug type and the position of the plug is changed to switch the flow of fluid therethrough by the reciprocating movement of lever arm 41 which is operated by solenoids 42 and 43 and has a toothed quadrant 44 at its opposite end meshed with a gear 45 provided on the stem of the valve.

Magnetic relay 46 operates to supply electrical energy, conducted thereto from any convenient source through lines 47 and 48, alternately to solenoids 42 and 43. The coil of solenoid 42 is connected at one end with line 48 and at its opposite end with contact point 49 of the relay. An adjacent contact point 50 of the relay is connected with line 47 so that when the contact points 49 and 50 are bridged by conductor 51 on the movable arm 53 of the relay, the circuit through solenoid 42 is completed. The coil of solenoid 43 is connected at one end with line 48 and at its opposite end with contact point 54 of the relay, while the adjacent contact point 55 is connected with line 47 so that when points 54 and 55 are bridged by conductor 52 on arm 53, the circuit through solenoid 43 is completed.

Lines 47 and 48 are also electrically connected with a synchronous motor which operates timer 56 and these lines also supply current to the primary winding of a step-down transformer 57. The secondary winding of the transformer, in which low voltage current is produced, is grounded to the outer metal wall of the metering device as indicated at 58 and is connected at its opposite end to one end of each of the coils of the electromagnets 59 and 60 of the relay. The opposite end of the coil of magnet 59 is connected with contact point 61 positioned within and adjacent the upper end of the standpipe or leg 37. The opposite end of the coil of electromagnet 60 is connected with a similar contact point 62 positioned within and adjacent the upper end of the standpipe or leg 36.

Small permanent magnets 63 and 64 are provided on opposite sides of the movable arm 53 of the relay to retain the latter in the position to which it is drawn by electromagnet 59 or electromagnet 60, as the case may be, until the opposite electromagnet is energized, thus keeping the circuit closed between contact points 49 and 50 after electromagnet 59 is energized and until electromagnet 60 is energized and keeping the circuit closed between contact points 54 and 55 after electromagnet 60 is energized and until electromagnet 59 is energized.

A counter 65 is supported, in the case here illustrated, from a suitable pedestal 66 mounted on line 30 in such a manner that it is tripped by a suitable cam 67 provided at the upper end of arm 41 when the latter moves from left to right and from right to left past the counter.

To further illustrate the operation of the metering device shown in Fig. 2, we will assume that valve 31 is in a position at which the flow of fluid therethrough is in the direction indicated by the solid arrows on the valve. Counter 65 and timer 56 are set at zero, switch 68 in line 47 is closed and the fluid to be metered is introduced into line 30. It flows therefrom through line 32 into accumulator 34 wherein it displaces the mercury or other electrically conductive liquid disposed in the opposite legs of the left-hand U tube. The normal level of the liquid in the U tube is indicated at C and as the fluid being metered enters accumulator 34 said level in the latter is forced downward and the level in leg 36 is forced upward until it reaches contact point 62 and thus closes the circuit to the coil of electromagnet 60, energizing the same and drawing arm 53 of the relay to the left to break the circuit between contact points 49 and 50 and close the circuit between contact points 54 and 55. This closes the circuit to solenoid 43 and forces lever arm 41 to the left, tripping counter 65 and reversing the position of valve 31 so that the flow therefrom is changed to that indicated by the dotted arrows. The permanent electromagnet 64 now holds arm 53 in the left-hand position to keep solenoid 43 energized until the fluid being metered, which is now entering accumulator 35, forces the liquid downward from level C therein and upward from level C in leg 37 until it reaches contact point 61. Meanwhile, the liquid in leg 36 is receding to level C and forcing the fluid which has been measured from accumulator 34, back through line 32 and valve 31 into and through discharge line 40.

When the electrically conductive liquid in leg 37 reaches contact point 61, it closes the circuit to electromagnet 59, energizing the same and causing arm 53 of the relay to move to the right, breaking the circuit to solenoid 43 between contact points 54 and 55 and closing the circuit to solenoid 42 across the contact points 49 and 50. Solenoid 42, which is now energized, throws the lever arm 41 to the right, tripping counter 65 and shifting the position of valve 31 so that the flow therethrough is again changed to that indicated by the solid arrows. This operation is repeated over as long a period as desired, counter 65 being tripped at each alternation of the flow through valve 31 and timer 56 operating continuously as long as the metering device is in use.

In the operation above outlined, fluid to be metered may be, for example, a liquid hydrocarbon of sufficiently lower conductivity than the heavier liquid in the U tubes that the low voltage current from transformer 57 will not flow through the hydrocarbon liquid between points 61 and 62 and the electrically conductive wall of the device to which transformer 57 is grounded, but will flow through the heavier liquid when it reaches contact points 61 and 62.

Assuming that the capacity of each of the legs 36 and 37 of the U tubes between level C and the level of the contact points 61 and 62 is exactly one gallon, a reading taken on counter 65 fifteen minutes, for example, after the operation of the device has started may be multiplied by four to give the average rate of flow of hydrocarbon liquid in gallons per hour. The reading of the counter will be a direct indication of the gallons measured from the start of the operation until the counter is reset.

Preferably to facilitate determination of the flow rate at any desired instant during operation of the device, timers 19 and 56 of the respective Figs. 1 and 2 are graduated in hours, tenths and hundredths of hours rather than in hours, minutes and seconds and preferably the displacement capacity of the U tubes is a multiple or fraction of a gallon, liter, cubic foot or whatever unit of measurement is employed, the counter being graduated in the same multiple or fraction of said unit.

While the measurement of hydrocarbon liquids has been used in the above examples of the operation of my device, it will be understood that it is equally applicable to the measurement of other liquids and that, by calibrating the device to compensate for the weight of the mercury or other displacement fluid employed in the U-tubes, or by employing a suitable constant to correct for the effect of this weight, the volume and flow rate of gases and compressible fluids generally may also be measured.

I claim as my invention:

1. A device of the class described comprising, an inlet conduit and an outlet conduit for fluid the flow of which is to be measured, a valve disposed between and connected to said conduits which is operative to block the flow of fluid from the inlet to the outlet conduit, a U-tube containing heavy liquid and having one leg in communication with said outlet conduit at all times during operation of said device, means including said valve for directing fluid from the inlet conduit into the other leg of the U-tube to decrease the liquid level in said other leg and increase the liquid level in said one leg and for directing fluid back from said other leg into the outlet conduit under pressure due to the difference in liquid level in said legs, and means responsive to changes in the level of said heavy liquid in the U-tube for operating said valve to alternate the flow of said fluid into and from the U-tube.

2. A device of the class described comprising, in combination, a U-tube having its opposite legs connected with a common conduit, a normally open block valve interposed in said common conduit between its points of connection with the U-tube, electrical means for operating said block valve, an electrically conductive heavy liquid disposed within the U-tube, an electrical circuit including an electromagnetic relay having the coil of its electromagnet in a circuit of low voltage electrical energy, said circuit being completed through said heavy liquid in the U-tube when the levels thereof in its opposite legs are substantially the same and said circuit remaining closed until a predetermined differential level of said liquid is reached in the U-tube, whereupon said circuit is broken, the relay being constructed and arranged to so regulate the flow of electrical energy to the valve-operating electrical means that the valve is closed when said heavy liquid is at substantially the same level in opposite legs of the U-tube and is opened when said differential level is reached.

3. The device defined in claim 2 having a counter, means constructed and arranged to trip said counter in response to each return of said liquid from said differential level to substantially the same level in opposite legs of the U-tube.

4. The device defined in claim 2, wherein the valve-operating electrical means comprises a solenoid which closes the valve when energized, said device including a counter, means constructed and arranged to trip said counter in response to each return of said liquid from said differential level to substantially the same level in opposite legs of the U-tube, and a timer driven by a self-starting synchronous motor supplied with electrical energy only while the solenoid is energized.

5. A device for metering fluids comprising a pair of U-tubes, a relatively heavy liquid carried by said U-tubes, valve means through which one leg of each of the U-tubes is communicable with an inlet conduit for the fluid to be metered and with an outlet conduit for the metered fluid, the other leg of each of the U-tubes being in direct communication with said outlet conduit, and means for operating the valve means to selectively direct fluid from the inlet conduit to the first named leg of either of the U-tubes and to simultaneously direct metered fluid from the first named leg of the other U-tube into said outlet conduit, the valve-operating means being responsive to changes in the level of said relatively heavy liquid disposed within the U-tubes.

6. A device for metering fluids comprising, a pair of U-tubes, a relatively heavy liquid carried by said U-tubes, an inlet conduit for the fluid to be metered, an outlet conduit for the metered fluid, a four-way valve having an inlet port connected with said inlet conduit and an outlet port connected with said outlet conduit, said valve blocking direct communication between the inlet and outlet conduits, one leg of each of said U-tubes communicating respectively with other inlet and outlet ports of the valve, the other leg of each of the U-tubes communicating directly with said outlet conduit, and means for operating said valve in response to changes in the level of said heavy liquid disposed within the U-tubes to selectively direct fluid from the inlet conduit into the first named leg of either of the U-tubes and to simultaneously direct fluid from the first named leg of the other U-tube into the outlet conduit.

JERRY McAFEE.